United States Patent [19]

Evans et al.

[11] 4,013,598

[45] Mar. 22, 1977

[54] COMPOSITION AND METHOD FOR MAKING SEAMLESS FLOORING AND THE LIKE

[76] Inventors: Robert M. Evans, 2399 Edgerton Road, University Heights; Joseph S. Fogel, 1365 Forest Hills Blvd., Cleveland Heights, both of Ohio 44118

[22] Filed: July 2, 1975

[21] Appl. No.: 592,542

Related U.S. Application Data

[62] Division of Ser. No. 270,620, July 11, 1972, Pat. No. 3,908,043.

[52] U.S. Cl. .................. 260/13; 260/33.6 UB; 260/77.5 AM; 260/77.5 AP; 260/77.5 AT; 428/425

[51] Int. Cl.² .................. 428 413; 428 423; C08K 5/01; C08L 1/14

[58] Field of Search ..... 260/13, 33.6 UB, 77.5 AM, 260/77.5 AP, 77.5 AT

[56] References Cited

UNITED STATES PATENTS

| | | | |
|---|---|---|---|
| 3,534,000 | 10/1970 | Blanc et al. | 260/13 |
| 3,549,404 | 12/1970 | Liberti et al. | 260/29.6 |
| 3,717,612 | 2/1973 | Babayan | 260/830 |
| 3,721,640 | 3/1973 | Wilhelm et al. | 260/33.6 UB |
| 3,775,354 | 11/1973 | Hostettler et al. | 260/2.5 AN |

OTHER PUBLICATIONS

Saunders et al.—Polyurethanes: Chemistry & Technology, II Technology (Interscience)(N.Y.)(1964), p. 532.

*Primary Examiner*—Melvyn I. Marquis
*Assistant Examiner*—H. H. Fletcher
*Attorney, Agent, or Firm*—Bacon & Thomas

[57] ABSTRACT

Coated substrates of much superior wear and stain resistance are formed by successively superimposing epoxy resin and at least 3 coatings of polyurethane each formed from diisocyanate and branched chain polyols that are crosslinked by a polyhydroxy material, the outer coating being of different composition from inner coatings, and comprising a polycaprolactone chain extender. This invention relates to highly wear resistant and decorative seamless flooring which may be formed over various surfaces such as concrete, wood, vinyl asbestos tile, and the like, from a plurality of coats of liquid compositions. It particularly relates to the wear resistant glaze layers of a seamless flooring, and to a polyurethane base composition used for forming such layers.

13 Claims, No Drawings

COMPOSITION AND METHOD FOR MAKING SEAMLESS FLOORING AND THE LIKE

This is a division of application Ser. No. 270,620, filed July 11, 1972, now U.S. Pat. No. 3,908,043.

BACKGROUND OF THE INVENTION

Polyurethane compositions have been proposed for and used in the preparation of seamless flooring for several years. In the year 1969, approximately 16 million gallons of clear urethane glaze were used for this purpose, indicating a dollar volume of about one hundred million dollars. In 1971, however, the sales were only about 2 to 5 million dollars, showing that the polyurethane glaze flooring as theretofore sold, did not meet expectations.

In the flooring as earlier used, a coating of moisture curing polyurethane (about 40% solids) in a solvent such as xylene or other solvent, was applied to the substrate to saturate it and provide adhesion. After the first coat had at least partially cured, a second coat was applied, and while the second coat was still wet, chips of colored dry paint were scattered over and pressed through the surface. When this layer had dried, the chips which had not adhered were swept away, the surface sanded and vacuumed, and another coat of clear urethane glaze was applied thereover. While that coat was still wet, chips were again scattered over the surface, pressed therein, and when the coating had hardened, the floor was again swept and vacuumed, and a further clear coat of urethane glaze (40% solids) applied. As soon as that coating had hardened, many more coats of 40% solids urethane glaze were applied thereover, each one after the former had hardened.

The flooring as thus produced had these drawbacks: The first coat did not adhere satisfactorily to grade level concrete. It was a 40% urethane glaze in hydrocarbon solvent and thus dissolved hydrocarbon soluble stains which were invariably present on the floor, and these stains migrated through to the top of the flooring. Furthermore, the urethane composition invariably turned brown after prolonged exposure to ultraviolet light. Finally the many coats required a great deal of labor, could not be applied in a single day, and the large quantities of solvent such as xylene caused considerable toxicity and odor.

Consequently, the industry evolved the following system:

1. A sealer coat was applied to keep out stains, give adhesion to any substrate, and bond to the next coat. This was either a 100%-solids epoxy or an epoxy emulsion.

2. A chip coat was developed to hold the chips, bridge cracks in the floor, and bond to the next coat. Ordinarily this was the same as the sealer coat.

3. A chip-binding coat or intermediate coat was applied to bind the very hydrophilic chips to each other and to harden them up enough so that they could be sanded. In most cases one or more coats of a polyurethane glaze was used for this purpose, but in some instances a polymeric latex or a clear epoxy emulsion was used. 4. Finally, glaze coats of curing polyurethane in solvent were applied to provide the wearing surface and to give abrasion resistance, stain resistance, and leveling. For each of the coats, an obvious requirement is rapid cure. Without it the job would take too long to be practical.

While the multi-layer system thus proposed is much superior to the original system, it will has many problems. When the epoxy emulsion or 100% solids epoxy is used for both sealer and chip coats, it becomes brittle, shrinks and cracks. This is permissible in a sealer coat, but not a chip coat, which must bridge cracks. In addition, the cure rate of the epoxies is very temperature dependent. Being two package materials, a material with a reasonably long pot life has an inordinately long cure time on a cold floor. Another problem peculiar to the epoxies, when used in urethane systems, is "purpling". The cause is not well understood, but in a significant number of cases the interface between the epoxy and an unpigmented urethane develops an unslightly purple color.

While the currently available base and chip coats present problems, they are more satisfactory than the currently available glazes which have the following faults:

A. The very high xylene content is unsatisfactory for two reasons — the large amount of xylene is unpleasant and dangerous, and the solids content of the glaze is so low that several coats must be applied leading to high labor costs.

B. The glaze yellows badly because of the aromatic isocyanates used. Ultraviolet absorbers effectively halt yellowing only temporarily— a few months to a year —before the film yellows as much as if the absorber were not there.

C. The film formed from the glaze abrades rather quickly.

The obvious solution to the high xylene content, to use less reduction, did not work: Bubbles formed, which eventually broke and collected dirt. Apparently, reducing the xylene content permitted the surface skin to form. This stopped outward diffusion of carbon dioxide which, being entrapped, formed bubbles.

A solution to the yellowing problem is the use of the non-yellowing aliphatic isocyanates. All of these have certain disadvantages. For example, hexamethylene diisocyanate is extremely expensive, is highly toxic, and rather slow to cure. Hydrogenated MDI (HMDI) has two isocyanate groups with equal reactivity. Consequently, it forms highly viscous prepolymers which have a high percentage of free HMDI, which is extremely allergenic via skin absorption.

Isophorone diisocyanate, IPDI, a new material from Germany, seems to be the best isocyanate available. It is the lowest-priced aliphatic diisocyanate. Its two isocyanate groups are of unequal reactivity so that it gives lower-viscosity prepolymers containing less free monomer vis-a-vis HMDI. However, IPDI has serious drawbacks: although less toxic than HMDI or hexamethylene diisocyanate, it can still cause serious harm via skin absorption. Clear films from IPDI prepolymers degrade to liquid in strong sunlight. Prepolymers formed from the more reactive aliphatic isocyanate group of IPDI are terminated by the less-reactive cycloaliphatic isocyanate groups which moisture cures slowly.

The abrasion resistance problem is probably the most serious. Abrasion resistance is the property which is sought by the purchaser of a seamless floor. None of the solutions mentioned above helped to improve this property. The aliphatic isocyanates, rather than helping improve abrasion resistance, made it worse.

Floor surfaces, particularly those in public buildings, require not only abrasion resistance, but resistance to contamination or staining caused by tar or asphalt brought in by foot traffic from road or parking lot surface. To be a successful floor coating composition, the resulting coating must adhere strongly to the base, must dry or cure bubble free, must produce in a single application a heavy coating that is highly resistant to both abrasion and asphalt staining.

It is an object of the present invention to provide a laminated, seamless, polyurethane-base flooring that may be applied over a substrate such as concrete, wood, or the like, which adheres strongly, bridges small cracks, is not stained by migration of staining materials from the substrate, is stain resistant to asphalt, tars, and the like, has abrasion resistance superior to prior polyurethane-base floorings, is decorative, requires lower labor cost and less solvent than did urethane-base seamless floorings heretofore used, and which is free from the yellowing and deterioration caused by ultraviolet radiation.

It is another object of the present invention to provide a polyurethane-base coating composition of high solids content they may be applied over a suitably prepared base to provide a glaze layer of high wear resistance that resists staining by asphalt to a much greater extent than coatings previously proposed.

It is another object of the present invention to provide a polyurethane-base coating system that may be applied to suitably prepared vinyl tile, vinyl asbestos tile, wood, and the like. This will provide a clear, highly abrasion resistant coating which will not require expensive stripping and waxing.

It is a further object of the present invention to provide relatively low cost polyurethane-base coating compositions of high solids content which, although having excess of terminal —NCO groups, will have long term viscosity stability when maintained in moisture free containers, yet after it is mixed with a suitable crosslinking polyol, will set up and dry in a very few hours without bubbling.

Other objects of the present invention will become apparent from the following description of the invention.

The Invention

In accordance with the present invention, multi-layer seamless floors of exceptional quality are produced which, in most layers, comprise polyurethanes which are isophorone diisocyanate-polyol reaction products. Preferably all layers after the initial sealer coat that is applied to the substrate comprise such polyurethanes, but those in outer layers are of substantially different composition from those of inner layers.

We have found that the character of the polyl, including its branching, its equivalent weight, the basic chemical makeup thereof, and the type of alcohol groups, is of great importance in formulating the different coatings for the various layers of the flooring. Both polyol used in the prepolymer and that used as a chain extender can be varied. Furthermore, the separate polyurethane coatings such as those used for binding the paint chips and those used for providing abrasion and stain resistance must have a very different polyol composition in the prepolymer and/or chain extender. The separate coats are described in more detail below.

Sealer Coat

The first coating applied to the substrate is the sealer coat. We have found this may be the same as that used formerly, namely a pigmented commercial epoxy emulsion which is formed from two parts, one containing catalyst or curing agent such as amines in solvent, and the other, the resin curable with the curing agent. The two parts are preferably both separately pigmented and are mixed together just prior to use. The resin is applied over the clean substrate and allowed to cure for a couple of hours to a nearly tack-free condition. Example 1 is an excellent sealer coat.

EXAMPLE 1

Part A

Using a high speed disperser, the pigments are premixed in water along with other components except resin. The resin is mixed in. The composition:

| | Parts |
|---|---|
| Water | 451 |
| Propylene glycol | 50 |
| Hydroxyethylcellulose (thickener) | 9 |
| Igepal CO-610 (surfactant) | 0.62 |
| Tide (surfactant) | 1.8 |
| Deefo 97-2 (antifoamer) | 0.5 |
| R-900 titanium dioxide | 158 |
| No. 1 white | 476 |
| Epi Rez WD510 | 415 |

Part B.

Using a high-speed mixer the resin and propylene glycol are mixed, then alternate portions of No. 1 White and water are added, and finally the R-900. The composition:

| | Parts |
|---|---|
| Versamid 5501* | 152 |
| Propylene glycol | 50 |
| No. 1 White | 270 |
| Water | 513 |
| R-900 titanium dioxide | 88 |

*See Glossary in Appendix for composition of this and all subsequent trade names.

Equal volumes of Part A and Part B are mixed just prior to use.

Chip Coat

The second coating applied over the sealer coat is a polyurethane chip coat. The function of the chip coat is to adhere to the sealer coat and to the wear and stain resistant glaze or outer coats, and also to bond to, form a matrix for, and to reinforce the paint chips which provide the main design to the flooring.

The chip coat is preferably from a two pack material comprising a —NCO terminated prepolymer in one package and a crosslinking agent in another. It must have both a sufficiently long gel time to permit spreading, chip holding, and a sufficiently short drying time to permit further coats to be applied. The prepolymer in the coating should also have sufficiently low viscosity to permit application of a high solids solution, i.e. 60% or more solids, to give sufficient film build.

We have found that the polyol used in forming that main component of the chip coating should, for best results, be a branched chain material, for example, a triol or tetrol of between 1000 and 2000 equivalent weight and preferably between 1100 and 1500 equivalent weight. Such polyols are composed principally of propylene oxide units on a suitable branching base such as trimethlolpropane or pentaerythritol. Other polyols such as those derived from tetramethylene oxide, ethylene oxide, and ethylene oxide-propylene oxide block polymers are not excluded.

The polyol component of the coating can also be made up of a mixture of polyols of different equivalent weights, proportioned to provide equivalent weights within the 1000 to 2000 range so that the prepolymer with isocyanate and the resultant cured film will have a distribution of intervals between urethane or urea groups. Thus superior properties are obtained with prepolymers of a mixture of polyoxypropylenetriols (POPT), part of which mixture comprises a triol of 200 to 500 equivalent weight and part of which mixture is a triol of 1100 to 2000 equivalent weight, the parts being proportioned to provide a weight average equivalent weight of between 1000 and 2000.

The polyol is reacted with an aliphatic isocyanate to produce a prepolymer. The reaction is conducted under the standard conditions of such preparations. The diisocyanate should be one which has unequal reactivity of the two isocyanate groups. One such is hydrogenated 2,4-tolylene diisocyanate. Another, and preferably, is IPDI.

The diisocyanate (IDPI) and polyols can be proportioned so that in the prepolymer for the chip coats there are about 1.5 to 2.5 times as many (preferably about twice as many) equivalents of isocyanate (—NCO) as there are total equivalents of polyol. The equivalent weights of polyols are selected so that the total isocyanate utilized in the chip coat is not in excess of ⅓ of the weight of prepolymer solids (total of polyols plus isocyanate), preferably about 20% or not in excess of 25% of the prepolymer solids. The free unreacted —NCO in the prepolymer should be at least 1.5% but usually is less than 6% of the weight thereof, and about 2% to 4% is preferred with about 2½% to 3% being about optimum.

In the preparation of the prepolymer the isocyanate is mixed with a suitable solvent such as xylene or other suitable solvent or solvent mixture that is free of functional groups that would react with the isocyanate, and a small amount such as 0.1 to 0.25 parts of a catalyst which is preferably a dialkyl tin salt of a long chain fatty acid such as dibutyltin dilaurate. These materials are put into a closed reactor suitably equipped for stirring and for maintaining temperature of desired value. Moisture is excluded with a blanket of dry nitrogen. To materials in the reactor is added the polyol or polyol mixture, usually a triol of about 200 to 300 equivalent weight mixed with a triol of about 1200 to 2000 equivalent weight, the mixture being proportioned as above described. The materials are usually cooked at about 150° to 200° F during and from a few minutes to two hours after the addition of the triols. The resulting prepolymers are preferably about 80% solids in solution of xylene or other suitable hydrocarbon solvent.

EXAMPLE 2

A prepolymer for use in a chip coat is prepared by adding a mixture of

|  | Parts |
|---|---|
| LHT-240 (0.21 equivalent) | 51 |
| LHT-42 (0.82 equivalent) | 416 | to the following maintained at 160° F under a blanket of dry nitrogen:

| IPDI (1.03 equivalent) | 114 |
|---|---|
| Dibutyltin dilaurate | 0.7 |
| Xylene | 230 |

The materials are then cooked from a few minutes to 2.5 hours to complete reaction.

The chip coat is made by dispersing in a prepolymer pigments, both hiding and inert; viscosity stabilizers such as benzoyl chloride, boron trifluoride etherate, or acetic anhydride, and suspending agents such as asbestos fiber and/or hydrogenated castor oil. Additional solvent is generally needed. The mixture is ground in a pebble mill in the presence of a dry nitrogen atmosphere until it reaches a suitable fineness of grind. Example 3 is a preferred material.

EXAMPLE 3

A chip coat is prepared by grinding all together in a pebble mill under a blanket of dry nitrogen the following:

|  | Parts |
|---|---|
| Prepolymer of Example 2 | 2510 |
| R-900 titanium dioxide | 577 |
| No. 1 White | 2450 |
| 7R05 asbestos fiber | 43 |
| Benzoyl chloride | 6 |
| IPDI | 60 |
| Xylene | 360 |
| MPA-60 (pigment wetting agent) | 16 |

The materials are ground to the desired fineness of grind. If necessary more xylene is ground in to give 100 Krebs units viscosity. Finally

| Dibutyltin dilaurate | 3 |
|---|---| is mixed in.

Since example 3 requires 14 hours to cure with atmospheric moisture, we have found a crosslinking agent of particular type must be added to suitably shorten the drying time.

The normally used crosslinking agents, such as glycerol and low molecular weight triols, have been found to be unsuitable because they give, typically, dry times as long as moisture cure. We have found that resinous solids, having four or more hydroxyl groups, are required to provide satisfactory dry time and satisfactory pot life. Even some of the resinous materials with four or more hydroxyl groups in the molecule thereof, while giving sufficiently short dry time, may act too fast to provide sufficient pot life for good utility. A mixture of hydroxylated resins is found to be superior to one of these materials along in certain instances.

Particularly desirable crosslinking agents for the chip coat are epoxy resins prepared from Bisphenol A and epichlorhydrin having four to six hydroxyl groups per molecule. Such resins are obtained under the trade name Epi Rez 530, 530C and 550 from the Celanese Resins Division of the Celanese Coatings Company. Epi Rez 530 and 530C melt at 95°–105° C and have weight of 860–1015 per epoxide. Another class of resinous crosslinkers which have been found especially suitable are the copolymers of styrene and allyl alcohol, obtained from the Shell Chemical Company under the trademark name RP 330. This resin has an average of about 5.3 hydroxyl groups per molecule and a molecular weight of about 1600.

The dry time; the pot life, the time after mixing in the crosslinking agent during which the coating may be applied; the chip time, the time wherein the chips will adhere to the coating may be varied by using a combination of these materials. Examples 4–9 show these effects.

| | Examples 4–8 | | | | |
|---|---|---|---|---|---|
| Example | 4 | 5 | 6 | 7 | 8 |
| Chip coat | Example 3 | Example 3 | Example 3 | Example 3 | Example 3 |
| Crosslinking agent No. 1 | None | TP-440 | RP 330 | Epi Rez 530 | Epi Rez 530 |
| Parts crosslinking agent per hundred of chip coat | — | 3 | 5 | 2.5 | 1.25 |
| Crosslinking agent No. 2 | None | — | — | — | RP 330 |
| Parts crosslinking agent per hundred of chip coat | — | — | — | — | 2.5 |
| Dry time (hours)* | 7–11 | 12 | 2.3 | 5.5–6 | 2.7 |
| Pot life (min.)** | ∞ | — | 35 | 30–40 | 40–70 |
| Chip time (min.)** | — | — | 30 | 40–70 | 40 |

*Gardner Circular Dry-Time Recorder
**See text.

EXAMPLE 9

A crosslinking agent for the chip coat of example 3 is prepared by mixing together

| | Parts |
|---|---|
| Dibutyltin dilaurate | 58 |
| Epi Rez 530C | 366 |
| RP 330 | 417 |
| Hi-Sol 15 | 650 |
| Cellosolve acetate | 650 |

Typically, when the above is mixed with the chip coat of example 3, a dry time of 3 hours, a chip time of 30 minutes, and a pot life of 2 hours is obtained.

Another crosslinking agent which may be found satisfactory in reducing dry time while providing adequate chip and pot life is XR-17, a polymer of a hydroxyl-functional acrylic esters produced by the Rohm and Haas Company. Also suitable are polyesters based on adipic anhydride, and/or phthalic anhydride and mixtures of polyols such as trimethylol propane and ethylene glycol which give comparable functionality and equivalence.

Glaze Coat

While the intermediate coat follows the chip coat in the application of a seamless floor, it is easier to describe the glaze coat first because the intermediate coat is made from the prepolymer portion of the glaze coat.

Conventional glaze coats operate between these two formulation constraints: If they are too soft, they are subject to staining; if they are too hard, they have poor abrasion resistance. We have been able, by using particular polyester polyol chain extenders—with particular polyol prepolymers—to get both superior stain and abrasion resistance.

While a low isocyanate content, less than ⅓ of the weight of the prepolymer and preferably below 25% of the prepolymer, is the characteristic of the prepolymer in the chip coat, the glaze coat requires a high percentage of the isophorone diisocyanate (IPDI). For if the percentage of diisocyanate is reduced by using a relatively long chain polyol, the finish does not meet the essential resistance to staining by asphalt substances.

The glaze coat requires between 5 to 10% of free isocyanate on the solids thereof. It is found that abrasion resistance appears to increase as the rubbery nature of the material increases, and abrasion resistance tends to decrease as the hardness of the urethane composition increases. The stain resistance, on the other hand, increases with increased crosslinking or with an increase in the hardness of the urethane coating, but decreases with increase in rubbery properties or with decreasing crosslinking. The prepolymer used in preparing the glaze coat therefore has a relatively shorter chain polyol constituent, i.e. POPT, than has the prepolymer used in the chip coat materials. Instead of having an average equivalent weight in the polyol of 1000 to 2000, as is desirable in a chip coat, in a glaze coat we have found that the triol used should have an average equivalent weight of between 160 and 350 or 400. Free (unreacted) -NCO should be between 5% and 10% and preferably 6% to 9% or usually about 8% of the weight of the solids of the glaze coat. With less than 5% free isocyanate (based on weight of) on polymer solids, the stain resistance is below bare minimum requirements and with above 10%, the abrasion resistance may be much too low. Example 10 is a preferred prepolymer.

EXAMPLE 10

A prepolymer is prepared by adding under a blanket of dry nitrogen

| | | Parts |
|---|---|---|
| to | LHT-240 (1.22 equivalent) | 286 |
| | IPDI (2.44 equivalent) | 270 |
| | Hi-Sol 15 | 194 |
| | Dibutyltin dilaurate | 0.26 |
| | Ashland Spirits | 50 | maintained at 160° F. The materials are then cooked at 160° F for a few minutes to two hours to complete reaction. Then are added

| | |
|---|---|
| Dibutyltin dilaurate | 3.3 |
| SAG 47 | 0.0083 |

-continued

| | |
|---|---|
| Tinuvin 328 | 2.4 | relative abrasion resistance is measured by holding a sample, i.e. a suitable base coated with a film of the material to be tested, against the side of a 1 gallon jar mill, which is loaded with a charge of No. 25 grinding media and 1000 grams of aluminum oxide. The sample is measured at the start and after timed intervals until 30 minutes has elapsed with a portable 60° gloss meter in 4 places. The data is plotted and smooth curves are drawn through the points. The percent loss of gloss at 30 minutes is taken as the measure of abrasion loss. A lower value indicates superior abrasion resistance. Clean grinding media and new aluminum oxide are used in each test.

When the prepolymer of example 10 is permitted to moisture cure, the drying time is about 20 hours and the abrasion loss is 30–40% at 30 minutes. A conventional 40% solids glaze will lose 75% in the same time. Both to shorten dry time and to improve abrasion resistance, it is necessary to mix the free-isocyanate terminated prepolymer with a chain extender composition.

We have found outstanding abrasion resistance combined with stain resistance is obtained by combining the prepolymer with a chain extender based on a polycaprolactone triol. Although a number of polyols improve either abrasion resistance or drying time, only the combination of the polycaprolactone triol and the relatively low equivalent weight POPT in the polyurethane provides superior abrasion resistance, stain resistance and quick drying. A preferred polycaprolactone triol chain extender is Example 11.

EXAMPLE 11

A chain extender is prepared by mixing the following:

| | Parts |
|---|---|
| Cellosolve acetate | 270 |
| Solvesso 100 | 270 |
| EAB 551-0.2 (spreading agent) | 50 |
| PCP-0300 | 453 |
| DMP-30 (catalyst) | 0.7 |

When the chain extender of example 11 is "two-packed," i.e. mixed, with the prepolymer of example 10, one volume of chain extender per four volumes of prepolymer, and a film formed, the dry time is about 7 hours, the abrasion loss is 20–30% at 30 minutes and staining resistance is satisfactory.

In the above, in place of the PCP-0300, one may substitute equivalent weights of PC-0301 with substantially equivalent results. Also, we have found that Multron R-12A may be substituted in whole or in part for equivalent weights of PCP-0300 and obtain reasonably good, although somewhat inferior, results. When Multron R-2, having a high number of hydroxyls in the molecule, was substituted, the dry time surprisingly became excessive, and when Multron R-18, having a very high equivalent weight, was substituted, the mix was not compatible, indicating that polyesters, if used, should have an equivalent weight of about 200 to 600 and about 3 hydroxyls per molecule.

When RP 330 or EPI Rez 530C was substituted in the same manner, extremely poor abrasion resistance resulted. Epi Rez 550 provided better abrasion resistance but was incompatible. Hydroxyl modified polyacrylate XR17 provided a very rapid dry time and better abrasion resistance than other hard hydroxyl-containing resins but not so good as the PCP-0300. All of the hard resins improved the resistance to staining by lipstick, however.

Prepolymers from IPDI/PCP-0300 were prepared. That the unique combination of polycaprolactone triol with POPT led to better abrasion resistance than the all-polycaprolactone triol material is evident from examples 12–15.

EXAMPLE 12

A prepolymer was prepared, using the method of example 2, from the following:

| | Parts |
|---|---|
| IPDI (1.26 moles 2.52 equivalent) | 280 |
| Hi Sol 15 | 448 |
| Cellosolve acetate | 100 |
| PCP-0300 (1.52 equivalent) | 268 |
| Dibutyltin dilaurate | 3.4 |

Films of the above material, after moisture curing to the tack-free state, showed an abrasion loss of 75% at 30 minutes. This shows that PCP-0300 by itself gives poor abrasion resistance.

EXAMPLE 13

When the prepolymer was prepared by substituting in the formula of example 26, 1.26 equivalent (302 parts) of LHT-240 (polypropylene triol, equivalent weight 240) for the PCP-0300 to form the prepolymer and then prereacting that resultant prepolymer with sufficient PCP-0300 to react with 19% of the free -NCO and thereafter forming films, moisture cured, from the resulting prepolymer, the abrasion loss was 18% at 30 minutes.

Example 13 shows that modification of a POPT prepolymer with PCP-0300 gives much better abrasion resistance than either the unmodified POPT (example 10) or the unmodified PCP-0300 (example 13) prepolymer.

EXAMPLE 14

When the chain extender of example 11 was two-packed with the prepolymer of example 12 such that the ratio of NCO/OH was 1.9, the abrasion loss was 27% at 30 minutes and the dry time was 2.5 hours. This shows that the PCP prepolymer two-packed with the PCP produces a satisfactory glaze.

EXAMPLE 15

When the chain extender of example 11 was two-packed with the prepolymer of example 13 such that the ratio of NCO/OH was 2.0, the abrasion loss was 13% at 30 minutes and the dry time was 3.4 hours. This shows that the PORT prepolymer prereacted with PCP and then two-packed with PCP gives the best abrasion resistance, as well as excellent dry time.

We have found that in the glaze coatings the ratio of —NCO to hydroxyl in the urethane forming ingredients is very important. The ratio of free —NCO in the prepolymer to —OH in the polycaprolactone chain extender (e.g. example 11) must be at least 1.75 to eliminate tackiness in the floors or laminates produced (unless it is partially prereacted with polyol).

In example 10 we used a small percentage of an aliphatic solvent (Ashland Spirits). This is found to reduce the tendency of the high solids glaze to blister by entrapment of $CO_2$. If too much of the weak (aliphatic) solvent is used, the polyols needed for crosslinking during the curing step may precipitate and not react with the free —NCO of the prepolymer, weakening the bond. While one hundred percent aromatic solvent caused frequent blistering, we found that, when about ¼ of the volume of solvent is aliphatic, like Ashland Spirits, the solvent mix was satisfactory. More than ¼ gave cratering and syneresis of the polyol of the mixture.

The cratering or crawling tendency of the glaze, where the film seems to retract at certain points and form a crater, is reduced by incorporating therein a spreading agent such, for example, as cellulose-acetate-butyrate in the chain extender.

Also, a U-V absorber is added to reduce ultraviolet degradation and yellowing. The POPT and the IPDI tend to degrade under U-V. This is evidenced by yellowing and loss of abrasion resistance. Such substituted phenol U-V absorbers as Tinuvin 328 are quite effective.

The Intermediate Coat

The intermediate coat is applied to the chips that have adhered to the chip coat and is designed to penetrate the chips and to harden them, particularly at the high points. The high points can then be sanded off. To be easily sanded, the material should have poor rather than good abrasion resistance. It is therefore found that, instead of using a polycaprolactone based chain extender such as PCP-0300 or PCP-0301, that one of the polyhydric resinous hardeners should be used, such as RP 330 or EPI Rez 530. Furthermore, it is found that in order to penetrate the chips better, the chain extender part or hardening part of the intermediate coat should be thinned to the neighborhood of 30% solids or so. The intermediate coat is made with the same or a similar prepolymer as that used in the glaze coat, i.e. example 6. This is mixed with an equal volume of hardener as shown by the following example. The mixture of 30% solids hardener or chain extender and prepolymer will then be approximately 50% solids.

EXAMPLE 16

A hardener for an intermediate coat is made by mixing:

|  | Parts |
|---|---|
| Cellosolve acetate | 700 |
| RP 330 | 300 |
| DMP-30 | 0.7 |

Films of the intermediate coat, thus prepared, has a tensile strength of 2400 psi, elongation capacity of 100%, a dry time of 4¼ hours, and were easily sanded after 14 hours of drying. In an abrasion test, it lost 80–95% of its gloss in 30 minutes.

In the above hardener, the RP 330 may be substituted by other hard polyhydroxy compounds of resinous nature, such as Epi Rez 530 or hydroxy polyacrylates having at least 4 hydroxy groups per molecule but an insufficient number to cause gelation prematurely. Cellosolve acetate may be substituted by other solvents of comparable solubility properties with different drying characteristics.

The seamless flooring or seamless laminates produced by the present invention have excellent wear resistance, are highly decorative, adhere highly to substrates such as cement, even low-grade cement, and greatly decrease maintenance cost of buildings. They do not require waxing, as do most other types of flooring, and are now solving a substantial demand in the marketplace.

The definitions of the ingredients previously mentioned are shown in the following appendix.

It is to be understood that variations and modifications of the specific products and processes herein shown and described for purposes of illustration may be made without departing from the spirit of the invention.

EXAMPLE 17

A coating for vinyl asbestos tile which eliminates the need for waxing is applied as follows: The tile is cleaned with a good wax stripper until the surface is water break free. It is then allowed to dry. After it is dry, the prepolymer of Example 11 is mixed with the hardener of Example 16 in equal volumes. It is applied to the surface with a foam roller at a rate of about 400 sq. ft./gallon. It is allowed to dry for 3–5 hours.

Four volumes of the prepolymer of Example 11 are then mixed with one part of the prepolymer of Example 12. It is applied to the surface at a rate of 400 sq. ft./gallon. After overnight dry, it is ready for traffic.

EXAMPLE 18

A seamless flooring is applied as follows: The surface is cleaned, all cracks are filled, and it is allowed to dry. Part A of Example 1 is mixed with an equal volume of Part B of Example 1. It is applied to the surface with a trowel or roller and allowed to dry for two hours.

Then, four volumes of the chip coat of Example 2 are mixed with one part of the hardener of Example 3 and applied to the surface with a trowel or roller. at a rate of 180 sq. ft./gallon. Chips are broadcast into the surface within 30 minutes. The surface is allowed to cure for 3 hours. Equal volume of the prepolymer of Example 10 is then mixed with one volume of the hardener of Example 16 and applied by roller or trowel, to the chipped surfaces at a rate of 180 sq. ft./gallon. It is allowed to dry overnight and then sanded vigorously, and vacuumed clean. Four volumes of the prepolymer of Example 10 is mixed with one volume of the chain extender of Example 11 and allowed to dry for 6 hours after which a second coat of the same glaze can be applied If a second coat is not necessary, the floor can be opened to traffic the following morning.

EXAMPLE 19

The chip coat of Example 18 is replaced with a second coat of the epoxy emulsion of Example 1 and chips are broadcast into it.

APPENDIX I

Glossary of Raw Materials

Ashland Spirits — Ashland Chemical Company.
a mineral spirits of boiling range, initial — 310° F, 50%—341° F, end point — 396° F; kauri butanol value — 36.5% containing 10.1% aromatics and 1.0% olefins.

Cellosolve Acetate — Union Carbide Corporation
brand of ethylene glycol monoethyl ether acetate.

Deefo 97-2 — Ultra Adhesives Inc.
latex paint antifoamer.

DMP-30 — Rohm and Haas Company.
brand of 1,3,5-tris (dimethylamino) phenol.

EAB 551-0.2 — Eastman Chemical Products, Inc.
cellulose acetate butyrate containing 53% butyryl, 1.6% acetyl, 1.7% hydroxyl and having a viscosity by ASTM Method D-1343-54T of 0.27 sec.

Epi Rez 530, 530C and 550 — Celanese Resins, Div. of Celanese Coatings Company.
epoxy resins of the Bisphenol A/epichlorohydrin class. 530 and 530C — melting point 95°–105° C, 860–1015 weight per epoxide. 550 — melting point 145°–155° C, 2400–4000 weight per epoxide.

Epi Rez WD510 — Celanese Resins, Div. of Celanese Coatings Company.
diglycidyl ether of Bisphenol A formulated for dispersing in water.

Ferro No. 820 — Ferro Corporation brand of dibutyltin dilaurate.

HA-510 — Wyandotte Chemicals Corporation Pluradot HA-510 polyol.
POPT (90%) triol capped with ethylene oxide (10%); of 1500 equivalent weight.

Hi-Siol 15 — Ashland Chemical Company
an aromatic naphtha of boiling range, initial — 360° F, 50%–372° F, end point — 410° F; kauri butanol value —0 93. Humble Oil and Refining Company Solvesso 150 can be used interchangeably with Hi-Sol 15.

Igepal CO-610 — GAF Corporation brand of nonyl-phenoxypoly (ethyleneoxy) ethanol.

IPDI — Veba-Chemie AG.
isophorone diisocyanate.

LHT-240, -42, -112 — Union Carbide Corporation Niaz polyol.
POPT's of equivalent weight: LHT-240, 240; LHT-42, 1385; LHT-112, 500.

MPA-60 — Baker Castor Oil.
castor oil derivative used to aid pigment wetting.

Multron R-2, R-12A, R-18 — Mobay Chemical Company.
saturated polyesters of equivalent weight: R-2, 140; R-12A, 335; R-18, 935. approximate hydroxyl per molecule: R-2, high; R-12A, slightly more than 3; R-18, slightly more than 2.

PCP-0300, -0301, -0310 — Union Carbide Corporation Niax polyol.
polycaprolactone triols of equivalent weight: PCP-0300, 180; PCP-0310, 100; PCP-0310, 300.

Pluracol 220 — Wyandotte Chemicals Corporation.
POPT of 2070 equivalent weight capped ethylene oxide.

Polymeg 1000, 2000 — The Quaker Oats Company
polyether diols from tetrahydrofuran of equivalent weight: Polymeg 1000, 500; Polymeg 2000, 1000.

PORT
abbreviation for polyoxypropylene triol.

7R05 asbestos fiber — C.P. Hall Company

R900 TiO$_2$ — E.I. du Pont de Nemours & Company, Inc.
Ti-Pure R-900 grade of rutile titanium dioxide.

RP 330 — Shell Chemical Company Resinous Polyol 330.
a copolymer of styrene and allyl alcohol of equivalent weight 300 and molecular weight 1600, with an average of 5.3 hydroxyl groups per molecule.

Sag 47 — Union Carbide Corporation.
silicone antifoam.

Siladuct — Mameco International.
silane-containing isocyanate adduct.

Solvesso 100 — Humble Oil & Refining Company.
aromatic naphtha of boiling range; initial, 311° F; 50%, 320° F; dry point, 344° F; kauri butanol value, 92; mixed aniline, 56° F; containing 1.1% paraffins, 98.9% aromatics.

Solvesso 150
see Hi-Sol 15.

Tide
Procter & Gamble laundry detergent.

Tinuvin 328 — Geigy Industrial Chemicals.
an ultra-violet absorber of the benzotriazole-substituted phenol family.

TP-440, Tp-740 — Wyandotte Chemicals Corporation Pluracol polyols.
POPT's derived from trimethylopropane with equivalent weights: TP-440, 140; TP-740, 240.

Versamid 5501 — General Mills Chemicals, Inc.
a polyamide resin co-reactive with epoxy resins.

No. 1 White — Thompson, Weinman & Company.
grade of natural ground calcium carbonate.

XR-17 — Rohm and Haas Company.
isobutyl acetate solution of a hydroxyl-functional acrylic resin with a solution equivalent weight of 1760.

We claim:

1. A polyurethane base coating composition capable of forming films of high abrasion and stain resistance comprising: (1) a solution in volatile organic solvent of an —NCO terminated prepolymer of a diisocyanate having unequal reactivity of the two isocyanate groups and a polyoxypropylene triol which has an equivalent weight of 180 to 400; said prepolymer having a free —NCO content of 5 to 10%, and (2) a polycaprolactone triol in amounts to react with most of said —NCO of said prepolymer, the ratio of the equivalents of free —NCO in said prepolymer to equivalents of —OH in the polycaprolactone cross-linking agent being greater than 1.75.

2. The composition of claim 1 wherein the polymer solids content of said coating composition is at least 55%.

3. The composition of claim 2 wherein the volatile solvent is a mixture of aliphatic and aromatic hydrocarbon solvents.

4. The composition of claim 3 which also contains cellulose-acetate-butyrate dissolved therein.

5. The composition of claim 4 which contains an organic tin catalyst and a viscosity stabilizer.

6. The product of claim 1 wherein the prepolymer is prereacted with between 5 and 20% of the polycaprolacetone triol and the remaining portion required to reach an —NCO OH ratio greater than 1.75 is mixed in on the job.

7. The product of claim 1 which is partially prereacted with water and then reacted on the job with a polycaprolactone triol.

8. The composition of claim 1 wherein the —NCO terminated prepolymer of a diisocyanate having unequal reactivity of the two isocyanate groups is isophorone diisocyanate.

9. The composition of claim 1 wherein the —NCO terminated prepolymer of a diisocyanate having unequal reactivity of the two isocyanate groups is hydrogenated 2,4-tolylene diisocyanate.

10. A polyurethane base coating composition capable of forming films of high abrasion and stain resistance comprising: (1) a solution in volatile organic solvent of an —NCO terminated prepolymer of a diisocyanate having unequal reactivity of the two isocyanate groups and a polycaprolactone triol of equivalent weight between 100 and 250, said prepolymer having a free —NCO content of 5 to 10% and (2) a polycaprolactone triol in amount to react with most of said —NCO of said prepolymer, the ratio of the equivalents of free —NCO in said prepolymer to equivalents of —OH in the polycaprolactone crosslinking agent being greater than 1.75.

11. A polyurethane base coating composition capable of forming films of high abrasion and stain resistance comprising: (1) a solution in volatile organic solvent of an —NCO terminated prepolymer of a diisocyanate having unequal reactivity of the two isocyanate groups and a polyoxypropylene triol which has an equivalent weight of 180 to 400; said prepolymer having a free —NCO content of 5 to 10%, and (2) an adipic acid-polyethylene glycol copolymer polyester with excess hydroxyl groups in amounts to react with most of said —NCO of said prepolymer, the ratio of the equivalents of free -NCO in said prepolymer to equivalents of -OH in said adipic acid-polyethylene glycol copolymer polyester crosslinking agent being greater than 1.75.

12. The composition of claim 10 wherein the isocyanate prepolymer is isophorone diisocyanate.

13. The composition of claim 11 wherein the isocyanate prepolymer is isophorone diisocyanate.

* * * * *